(12) United States Patent
Lin

(10) Patent No.: US 7,661,648 B2
(45) Date of Patent: Feb. 16, 2010

(54) SUCKER DEVICE FOR A FIXING SUPPORT

(75) Inventor: Chung-Hung Lin, Syuejia Township, Tainan County (TW)

(73) Assignee: Jow Tong Technology Co., Ltd., Tainan Hsien (TW)

( * ) Notice: Subject to any disclaimer, the term of this patent is extended or adjusted under 35 U.S.C. 154(b) by 0 days.

(21) Appl. No.: 12/010,771

(22) Filed: Jan. 30, 2008

(65) Prior Publication Data

US 2009/0189033 A1 Jul. 30, 2009

(51) Int. Cl.
*A47G 29/00* (2006.01)
*F16M 11/00* (2006.01)

(52) U.S. Cl. ............... 248/683; 248/181.1; 248/205.5; 248/205.6; 248/309.1

(58) Field of Classification Search .......... 248/683, 248/205.5, 205.6, 205.7, 205.8, 205.9, 206.1, 248/206.2
See application file for complete search history.

(56) References Cited

U.S. PATENT DOCUMENTS

| | | | |
|---|---|---|---|
| 6,749,160 B1 * | 6/2004 | Richter | 248/206.2 |
| 2002/0158033 A1 * | 10/2002 | Chen | 211/103 |
| 2006/0027720 A1 * | 2/2006 | Wu et al. | 248/205.5 |
| 2007/0152119 A1 * | 7/2007 | Wang | 248/205.5 |
| 2007/0215766 A1 * | 9/2007 | Yen | 248/205.8 |
| 2009/0050758 A1 * | 2/2009 | Carnevali | 248/205.8 |

* cited by examiner

*Primary Examiner*—Amy J. Sterling
(74) *Attorney, Agent, or Firm*—Rosenberg, Klein & Lee

(57) ABSTRACT

A sucker device includes a body, a sucking disk, and an operating mechanism; the body has a base, and a sleeve part joined on the base; the sleeve part has a hollow portion communicating with a bottom room of the base, and two slots, and is joined to a fixing support; the sucking disk is positioned in the bottom room of the base; an axial rod is joined on a middle of the disk, and held in the hollow portion of the sleeve part; the operating mechanism includes a knob, and a pressing rod, which is passed through the axial rod, and sticks out through the slots; the knob is positioned around and threadedly engaged with the sleeve part; thus, the middle of the disk can be moved farther away from a surface of an object for the disk to stick to the object by means of turning the knob.

4 Claims, 9 Drawing Sheets

SUCKER DEVICE FOR A FIXING SUPPORT

BACKGROUND OF THE INVENTION

1. Field of the Invention

The present invention relates to a sucker device for a fixing support, more particularly one, which consists of a sucking disk, and an operating mechanism with a knob capable of being turned to move a middle portion of the sucking disk farther away from a surface of an object in order for the sucking disk to stick to the object.

2. Brief Description of the Prior Art

In order for people to use cellular phones, GPS navigating systems, MP3, iPod etc more conveniently while they are driving/riding in a car, certain manufacturers developed a fixing support with a sucker device; the fixing support is used to hold and fix such an electronic device while the sucker device is joined to the fixing support, and has a sucking disk to stick on a surface of an object such as the dashboard and the window of a car.

Various sucker devices are available such as were taught in U.S. Pat. No. 6,550,735 B1, U.S. Pat. No. 6,913,232 B2, U.S. Pat. No. 6,749,160 B1, German Patent DE 203 13 215 U1, and DE 103 11 112 A1. The above sucker devices have a sucking disk, and a cam capable of being operated to move a middle portion of the sucking disk farther away from a surface of an object; when the middle portion of the sucking disk farther away from the surface of the object, the space between the sucking disk and the object will be void of air, and in turn the sucking disk will firmly stick to the object. However, such a sucker device structure has a drawback: the middle portion of the sucking disk can't be moved even farther away from the surface of the object by means of the cam after the sucking disk becomes elasticity-fatigued through use for a long time. Consequently, the sucker device can no longer stick to an object firmly.

SUMMARY OF THE INVENTION

It is a main object of the present invention to provide an improvement on a sucker device for a fixing support to overcome the above problems.

A sucker device according to an embodiment of the present invention includes a body, an elastic plate-shaped sucking disk, and an operating mechanism.

The body has a base with a bottom curved holding room, and a sleeve part joined on an upper side of the base. The sleeve part has a middle hollow portion communicating with the curved holding room, an outer threaded portion, and lengthways extending slots on the threaded portion, and is joined to a bottom portion of a fixing support at an upper end thereof.

The sucking disk is positioned adjacent to a bottom of the base of the body, and has an upright axial rod securely joined to a middle thereof; the axial rod is held in the middle hollow portion of the sleeve part of the body, and has a transverse through hole.

The operating mechanism is used to move the sucking disk in order for the disk to stick to an object, and it consists of:

an elastic element held in the middle hollow portion of the sleeve part of the body and propped against an upper end of the axial rod;

a pressing rod passed through the transverse through hole of the axial rod and sticking out through the lengthways extending slots of the sleeve part at two ends thereof;

a knob positioned around the sleeve part, between the pressing rod and the base of the body, with the threaded portion of the sleeve part being threadedly engaged with a screw hole of the knob; the two outer ends of the pressing rod being propped against the knob; and a covering part positioned on an upper end of the knob, with the sleeve part being passed through a middle hole of the covering part; the knob has detainment holes on the periphery of the upper end while the covering part has embedded plate parts on the periphery, and is joined to the knob with the embedded plate parts being embedded in the detainment holes respectively.

The axial rod and the middle portion of the sucking disk can be moved farther away from the dashboard of a car by means of turning the knob; thus, the space between the sucking disk and the dashboard will be void of air, and the sucking disk will firmly stick to the dashboard.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
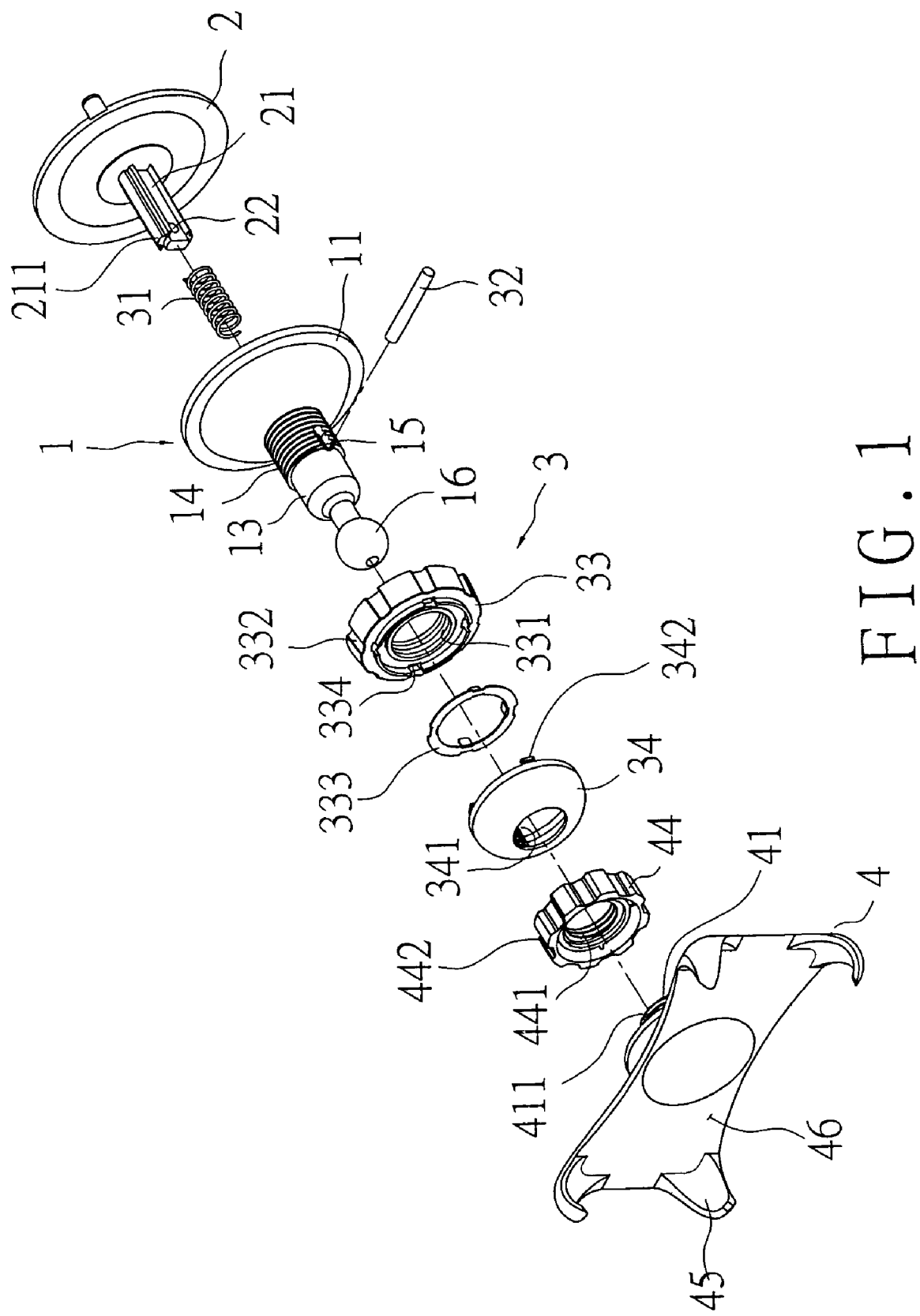
FIG. 1 is an exploded perspective view of the present invention.
Figure 2:
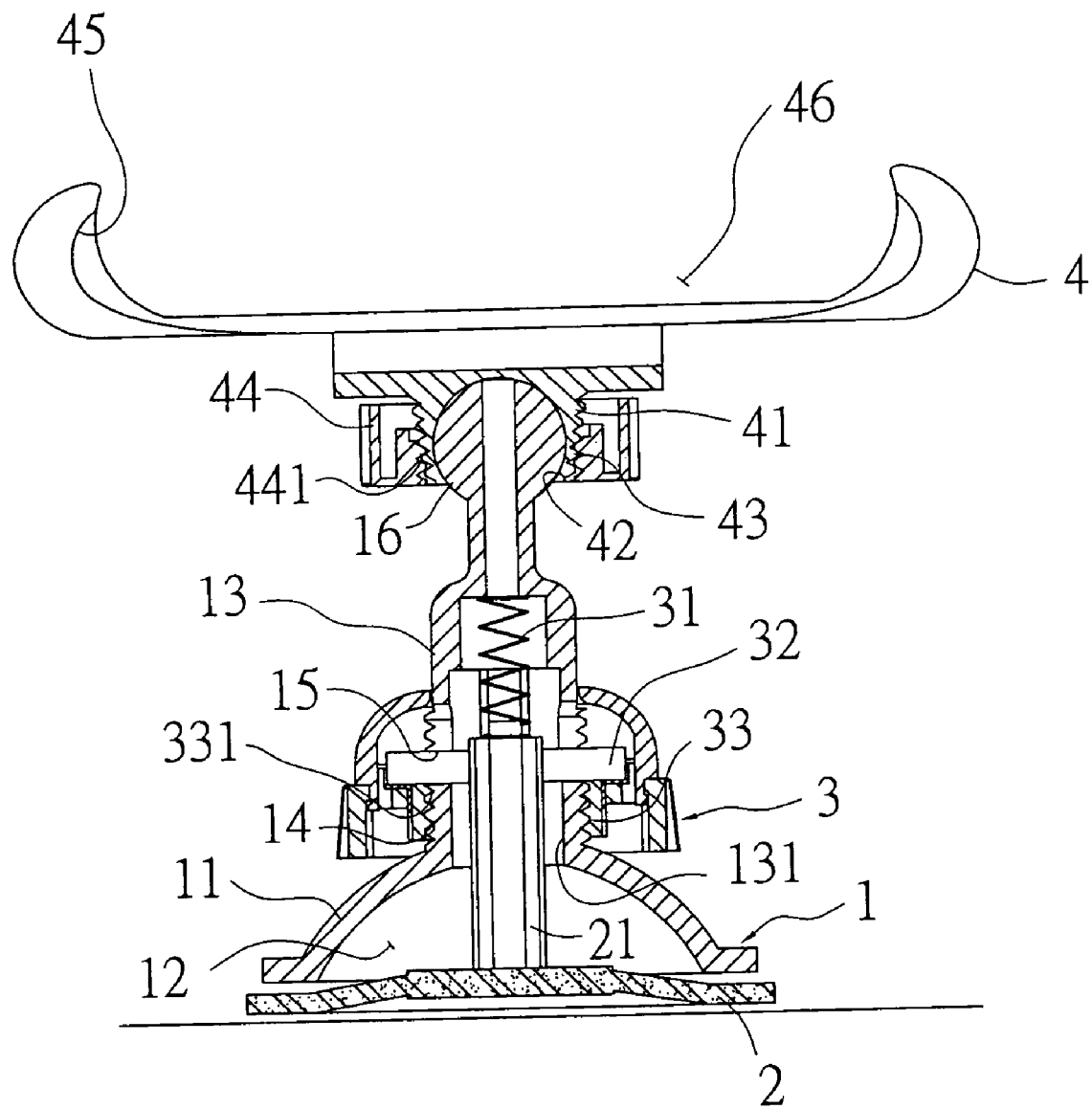
FIG. 2 is a sectional view of the present invention.

Referring to FIGS. 1 and 2, a preferred embodiment of a sucker device in the present invention consists of a body 1, a sucking disk 2, and an operating mechanism 3, and is joined to a fixing support 4.

The body 1 of the sucker device has a base 11, which has a curved holding room 12 on a bottom. The body 1 has a sleeve part 13, which is joined on an upper side of the base 11, and which has a middle hollow portion 131 in open communication with the curved holding room 12 of the base 11. The sleeve part 13 has a threaded portion 14 on an outer side, and lengthways extending slots 15 on the threaded portion 14 thereof. The body 1 further has a spherical joining part 16 on an upper end of the sleeve part 13.

Figure 3:
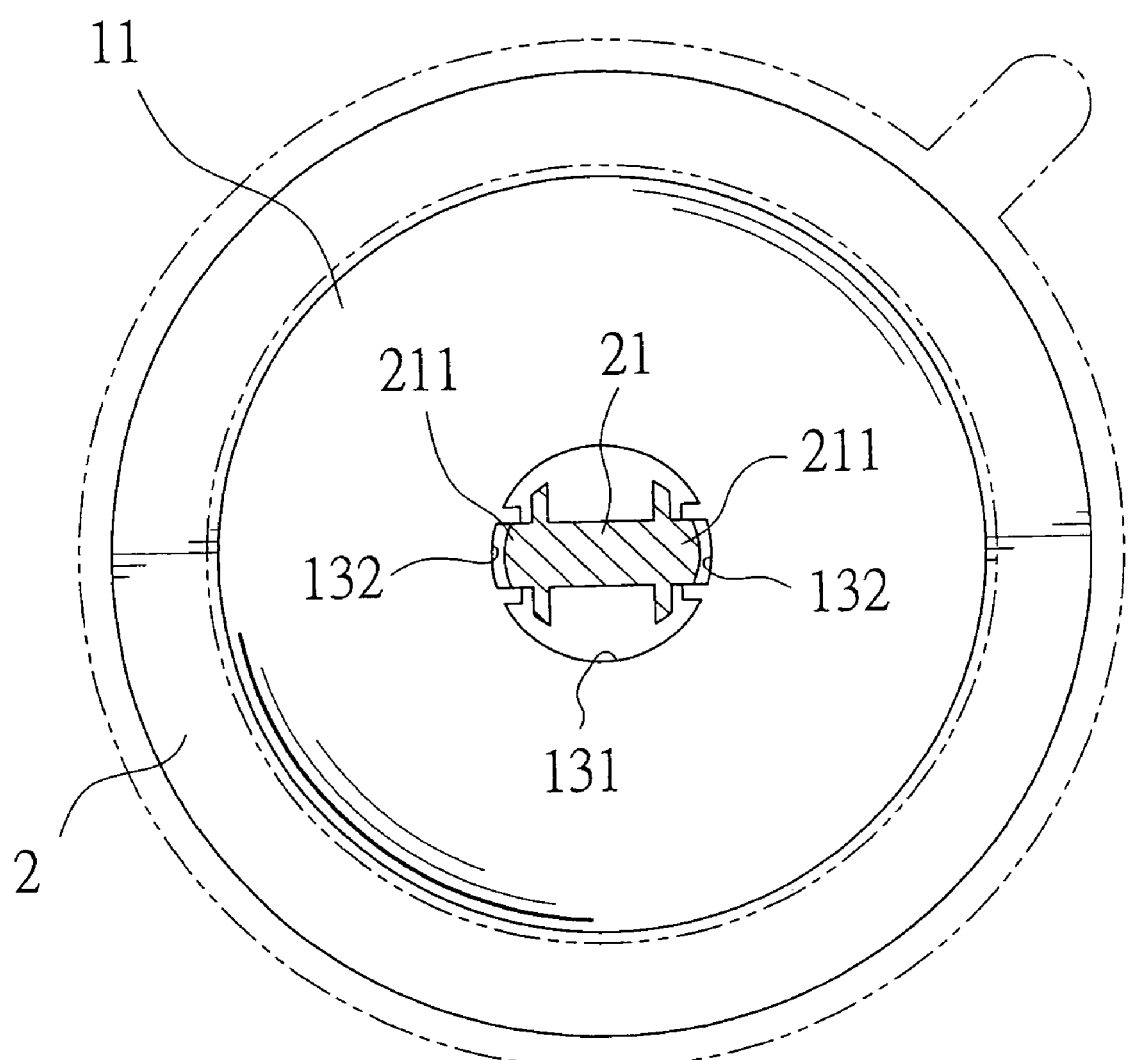
FIG. 3 is an enlarged partial sectional view of the present invention.

The sucking disk 2 is an elastic plate, and positioned adjacent to the bottom of the base 11 of the body 1. An upright axial rod 21 is securely joined to a middle of an upper side of the sucking disk 2. The axial rod 21 has a transverse through hole 22, and is held in the middle hollow portion 131 of the sleeve part 13; the middle hollow portion 131 has several guide grooves 132, and the axial rod 21 has guide protrusions 211, which are received in the guide grooves 132 respectively so as to prevent the sleeve part 13 from turning relative to the axial rod 21, as shown in FIG. 3.

The operating mechanism 3 consists of an elastic element 31 such as a spring, and a pressing rod 32. The elastic element 31 is held in the middle hollow portion 131 of the sleeve part 13, and propped against an upper end of the axial rod 21. The pressing rod 32 is passed through the transverse through hole 22 of the axial rod 21, and sticks out through the slots 15 of the sleeve part 13 at two ends thereof.

The operating mechanism 3 further includes a knob 33, which has a screw hole 331 on a middle, and is positioned around the sleeve part 13, between the pressing rod 32 and the base 11 of the body 1, with the threaded portion 14 of the sleeve part 13 being threadedly engaged with the screw hole 331. The knob 33 has an uneven (corrugated) outer surrounding side 332, and a metallic strengthening plate 333 secured on an upper end thereof. The two ends of the pressing rod 32 are propped against the metallic strengthening plate 33; thus, the pressing rod 32 doesn't contact the knob 33, and therefore is prevented from rubbing against the knob 33 to cause the knob 33 to wear/damage.

Furthermore, a covering part 34 is positioned on an upper end of the knob 33; the covering part 34 has a middle hole 341, and the sleeve part 13 is passed through the middle hole 341; the covering part 34 has several embedded plate parts 342 on a periphery thereof, and the knob 33 has detainment holes 334 on a periphery of the upper end, and the covering part 34 is securely joined to the knob 33 with the embedded plate parts 342 being embedded in the detainment holes 334 respectively.

The fixing support 4 has a truncated-cone shaped joining post 41 projecting from a lower side thereof. The truncated-cone shaped joining post 41 has a spherical joining cavity 42 thereon, and the spherical joining part 16 of the body 1 is detained in the spherical joining cavity 42. The joining post 41 has several apertures 411, and an outer threaded portion 43. A constricting component 44 with a middle screw hole 441 is positioned around the joining post 41, and threadedly engaged with the outer threaded portion 43 of the joining post 41 at the middle screw hole 441; thus, the joining post 41 is constricted so as to prevent the spherical joining part 16 of the body 1 from separating from it. Furthermore, the constricting component 44 has a corrugated uneven outer surrounding side 442. The fixing support 4 has several inwardly-curving gripping parts 45 protruding from a periphery thereof; thus, the fixing support 4 has a middle holding space 46, which is defined by means of the gripping parts 45.

Figure 4:
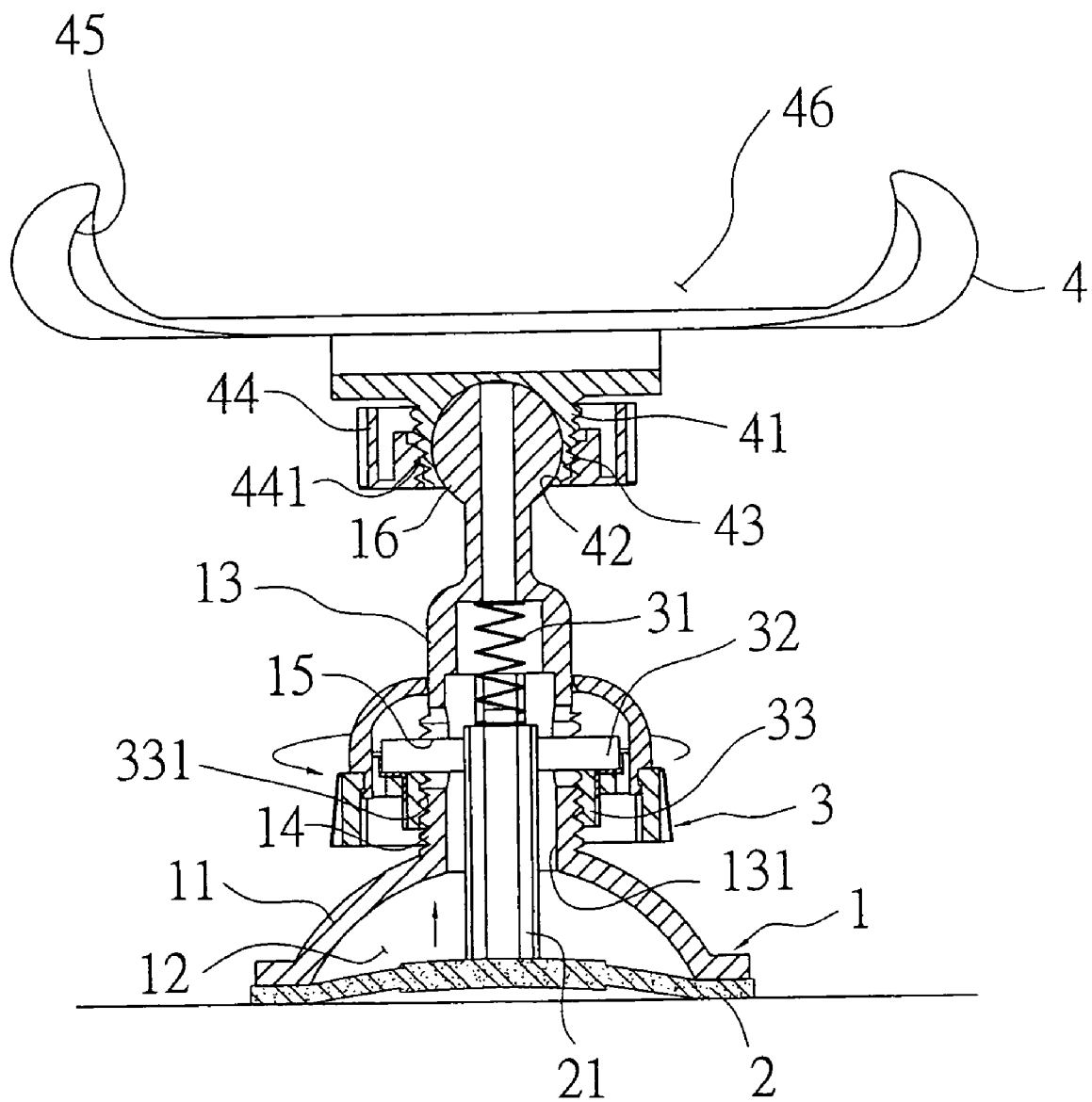
FIG. 4 is a view taken when the present invention is being used (1)

In use, referring to FIGS. 1 and 4, the sucker device joined on the fixing support 4 is secured on a stationary object, e.g. a dashboard and a window of a vehicle, at the sucking disk 2; to make the sucking disk 2 stick on the stationary object, the knob 33 is turned relative to the sleeve part 13 to move both the pressing rod 32 and the axial rod 21 in such a direction as to be farther away from the object, thus the middle portion of the sucking disk 2 is moved away from the object with an empty (void of air) space existing between the sucking disk 2 and the stationary object. Consequently, the sucker device is securely joined on the object. At the same time, the elastic element 31 will be compressed by the axial rod 21, and therefore exert a pushing force on the axial rod 21 so as to make the pressing rod 32 firmly pressed against the upper side of the knob 33.

When the knob 33 is turned so as to make the axial rod 21 and the middle portion of the sucking disk 2 become farther away from the stationary object, the space between the sucking disk 2 and the stationary object will be void of air, and in turn the atmospheric pressure will be greater than the air pressure inside the space between the sucking disk 2 and the stationary object, and the sucking disk 2 will firmly stick on the object. Furthermore, when the sucking disk 2 becomes elasticity-fatigued through use for a long time, the user can turn the knob 33 to make the middle portion of the sucking disk 2 become even farther away from the object in order for the sucker device to firmly stick on the object.

Figure 5:
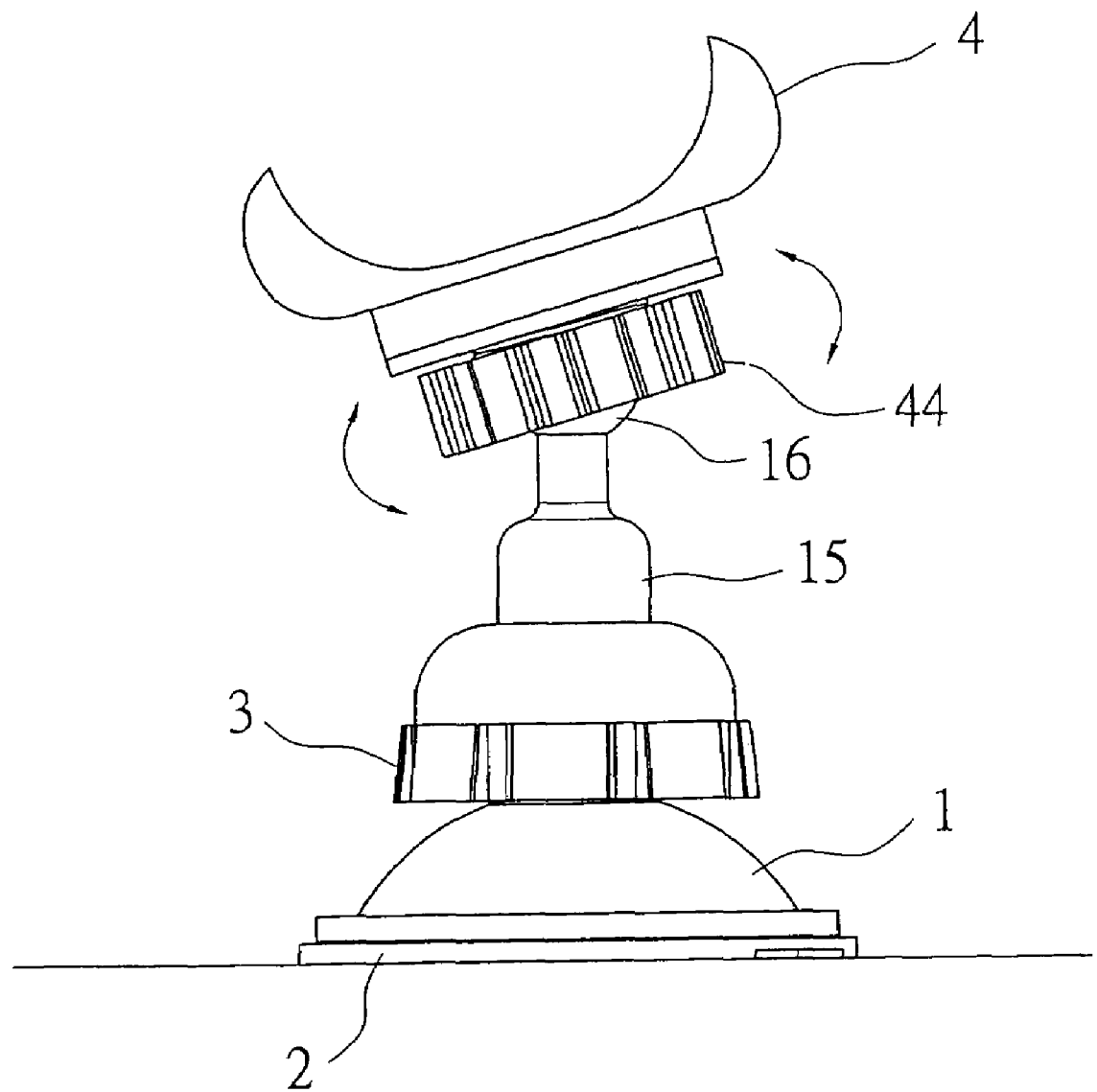
FIG. 5 is a view taken when the present invention is being used (2)

Referring to FIGS. 2 and 5, after the constricting component 44 is loosened, the fixing support 4 can be changed in orientation in relation to the sucker device because the spherical joining part 16 of the sucker device is held in the spherical joining cavity 42 of the joining post 41 of the fixing base 4; after the fixing support 4 has been adjusted to a new position, the constricting component 44 should be turned so as to be tight around the joining post 41 so that the apertures 411 of the joining post 41 become narrower, and the joining post 41 is tight around the spherical joining part 16 of the body 1 of the sucker device. Consequently, the fixing support 4 is firm on the sucker device.

The fixing support 4 is usually used to hold and fix an electronic appliance, e.g. a cellular phone, GPS navigator, palm game device, multimedia device such as iPod so that the electronic appliance can be used conveniently. Such an electronic appliance is positioned in the holding space 46 of the fixing support 4 to be gripped by means of the gripping parts 45.

Figure 6:
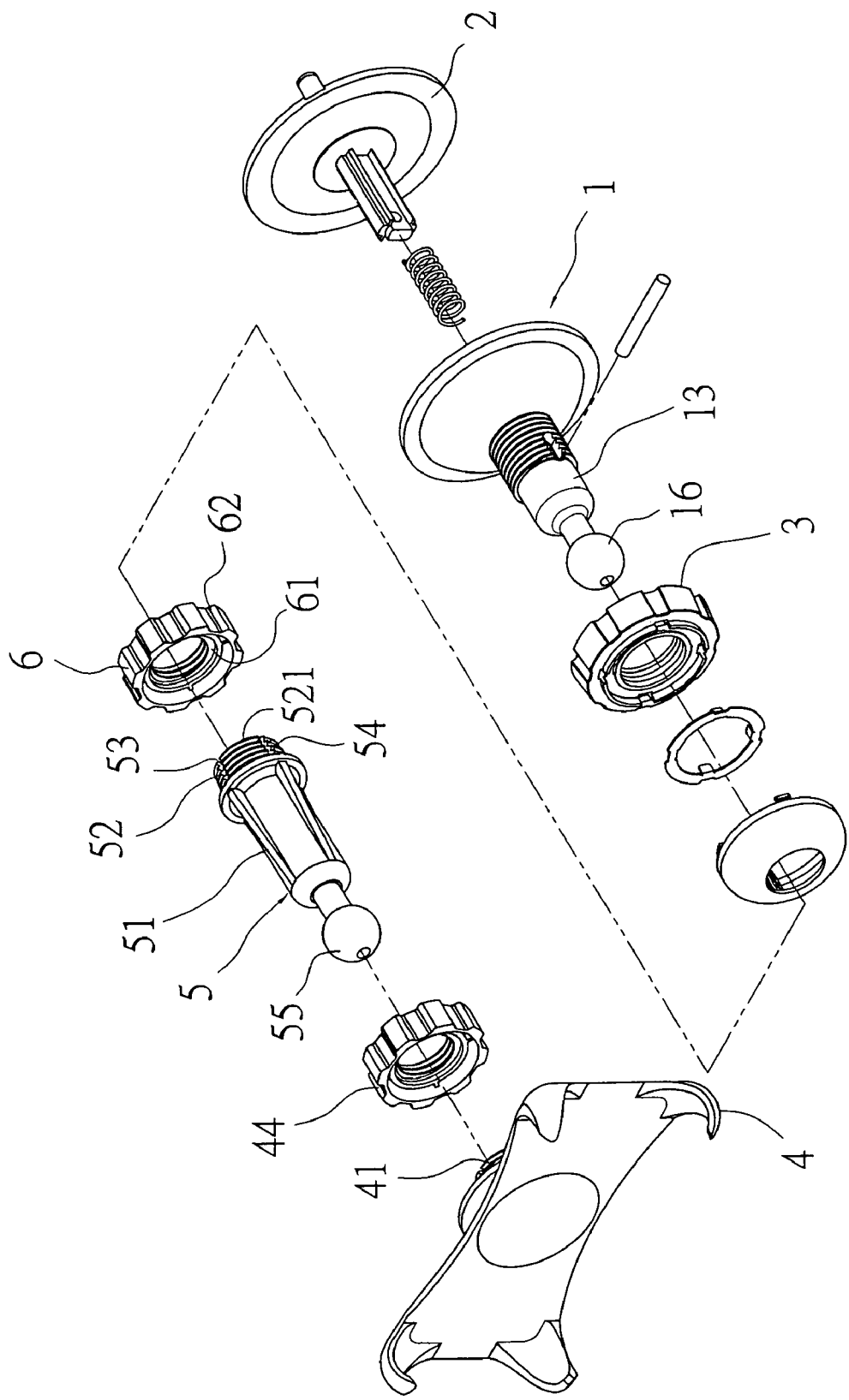
FIG. 6 is an exploded perspective view of a second preferred embodiment of the present invention.
Figure 7:
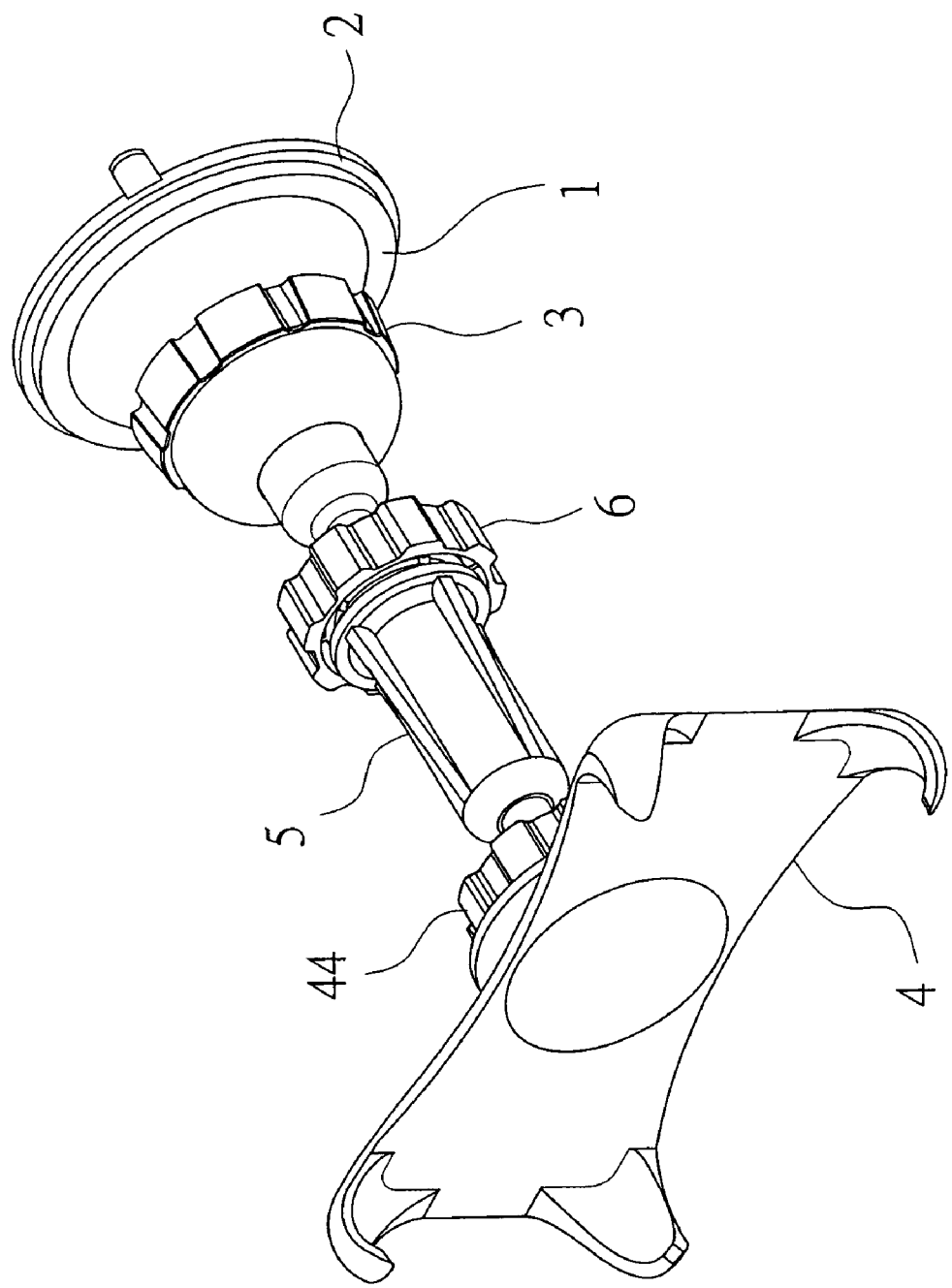
FIG. 7 is a perspective view of the second preferred embodiment
Figure 8:
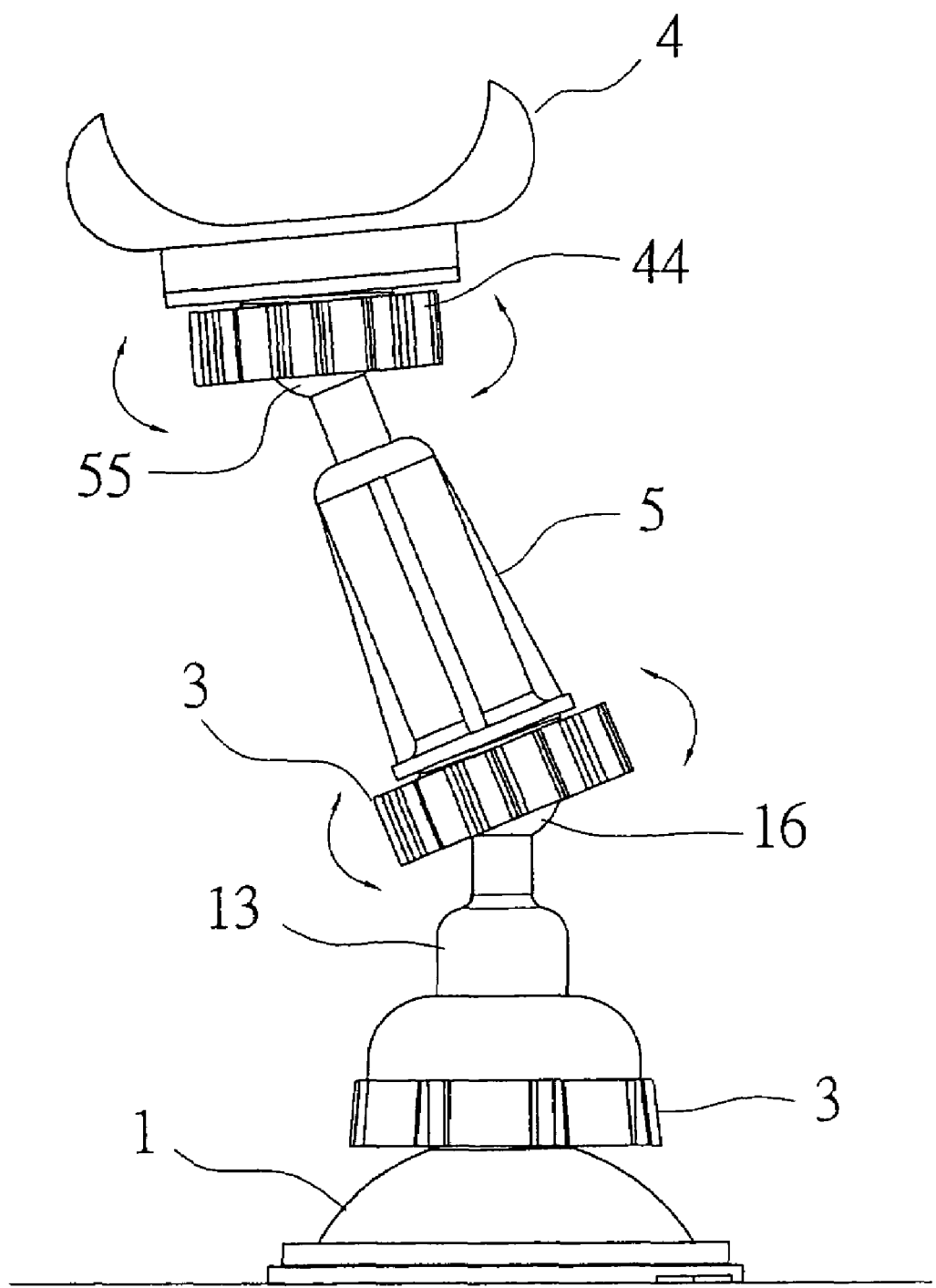
FIG. 8 is a front view taken when the second embodiment is being used.

Shown in FIGS. 6 and 7 is the second preferred embodiment a sucker device of the present invention, which is equipped with a coupling component 5 in addition. The coupling component 5 is used to couple a fixing support 4 to a body 1 of the sucker device, and has a rod part 51, a truncated-cone shaped joining post 52 protruding from a lower end of the rod part 51, and a spherical joining part 55 on an upper end of the rod part 51. The truncated-cone shaped joining post 52 has a spherical joining cavity 521 thereon, and the spherical joining part 16 of the body 1 is detained in the spherical joining cavity 521; the joining post 52 has several apertures 53, and an outer threaded portion 54. A constricting component 6 with a middle screw hole 61 is positioned around the joining post 52, and threadedly engaged with the outer threaded portion 54 of the joining post 52 at the middle screw hole 61; thus, the joining post 52 is constricted so as to prevent the spherical joining part 16 of the body 1 from separating from it. Furthermore, the constricting component 6 has a corrugated uneven outer surrounding side 62. The coupling component 5 is joined to the fixing support 4 with the spherical joining part 55 being detained the spherical joining cavity 42, and the constricting component 44 is positioned around the joining post 41, and threadedly engaged with the outer threaded portion 43 of the joining post 41; thus, the joining post 41 is constricted to hold the spherical joining part 16 of the body 1. Consequently, the fixing support 4 is coupled to the sucker device of the present invention by means of the coupling component 5, and the fixing support 4 and the coupling component 5 can be adjusted in orientation according to the user's need after the constricting components 44 and 6 have been loosened, as shown in FIG. 8.

Figure 9:
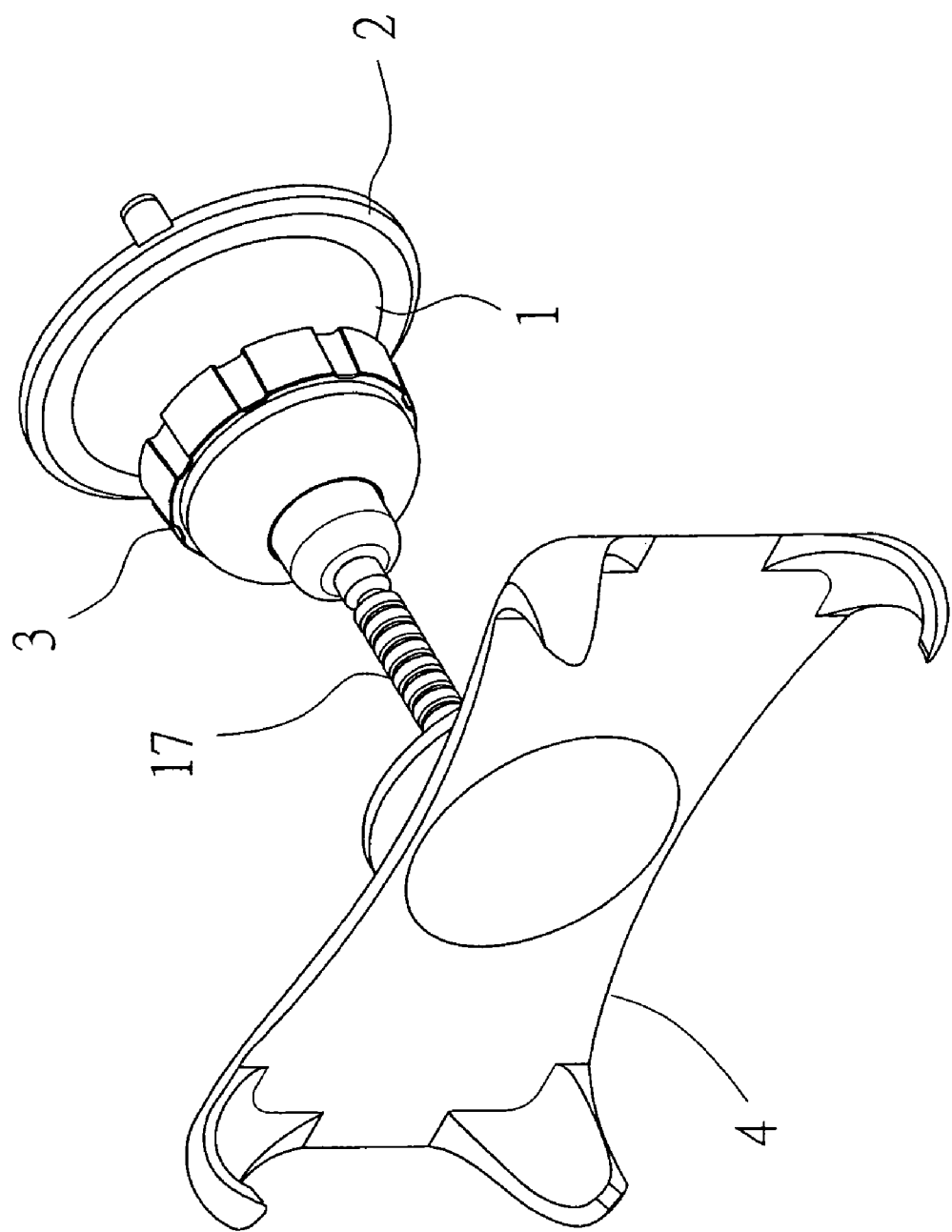
FIG. 9 is a perspective view of a third preferred embodiment.

Shown in FIG. 9 is the third preferred embodiment of a sucker device of the present invention; the body 1 of the sucker device has a soft tube 17, which is flexible, and is joined to the sleeve part 13 (FIG. 1) of the body 1 of the sucker device at one end, and joined to the bottom of the fixing support 4 at the other end.

Not only can the sucker device of the present invention be used in a car as described above, it can be used to couple the fixing support to any other objects with a flat surface as well.

From the above description, it can be seen that the present invention has the following advantages:

1. The sucking disk of the sucker device of the present invention is pulled at the middle portion in order for the middle portion to be farther away from an object to fix the sucker device so that difference exists between the atmospheric pressure and the air pressure inside the sucking disk, and the sucking disk can stick on the object firmly.

2. The knob of the operating mechanism can be turned to make the middle portion of the sucking disk become even farther away from the object if the sucking disk becomes elasticity-fatigued through use for a long time, and can no longer stick to the object firmly in its original lifted position; thus, the sucker device still can be firmly joined on the object. In other words, the present invention has a relatively long service life as compared with the prior arts.

3. An elastic element is positioned around an upper end of the axial rod joined on the sucking disk to depress the axial rod so as to make the pressing rod tightly pressed against the upper end of the knob of the operating mechanism to immobilize the knob, thus preventing the knob from becoming loose owing to shaking. Therefore, the sucking disk will firmly stick to a surface even if the sucker device is subjected to shaking.

4. After the constricting component of the fixing support is loosened, the fixing support can be adjusted in orientation because the spherical joining part of the sucker device is held in the spherical joining cavity of the joining post of the fixing base. Therefore, an electronic appliance, e.g. a cellular phone, GPS navigator, palm game device, held on the fixing support can be used in an optimum position.

5. The truncated-cone shaped joining post of the fixing support has several apertures thereon, and has the constricting component positioned round and threadedly engaged with its outer side. Therefore, the spherical joining part of the sucker device will be prevented from turning relative to the spherical joining cavity of the joining post of the fixing support after the constricting component is turned tight.

What is claimed is:

1. A sucker device for a fixing support, comprising
(a) a body, the body having a base with a bottom curved holding room; the body having a sleeve part joined on an upper side of the base; the sleeve part having a middle hollow portion communicating with the curved holding room of the base; the middle hollow portion of the sleeve part of the body having a plurality of guide grooves; the sleeve part having a threaded portion on an outer side thereof; the sleeve part having lengthways extending slots on the threaded portion thereof; the body being joined to a bottom portion of a fixing support at an upper end of the sleeve part;
(b) an elastic plate-shaped sucking disk positioned adjacent to a bottom of the base of the body; the sucking disk having an upright axial rod securely joined to a middle thereof and held in the middle hollow portion of the sleeve part of the body; the axial rod having a transverse through hole; the axial rod having guide protrusions thereon being respectively received in the guide grooves; and
(c) an operating mechanism to move the sucking disk in order for the disk to stick to an object; the operating mechanism including:
an elastic element held in the middle hollow portion of the sleeve part of the body and propped against an upper end of the axial rod;
a pressing rod passed through the transverse through hole of the axial rod and sticking out through the lengthways extending slots of the sleeve part at two ends thereof;
a knob having a middle screw hole; the knob being positioned around the sleeve part, between the pressing rod and the base of the body, with the threaded portion of the sleeve part being threadedly engaged with the screw hole of the knob; the two outer ends of the pressing rod being propped against an upper side of the knob; and
a covering part having a middle hole; the covering part being positioned on an upper end of the knob, with the sleeve part being passed through the middle hole of the covering part.

2. The sucker device for a fixing support as claimed in claim 1, wherein a metallic strengthening plate is positioned on an upper end of the knob, and the two outer ends of the pressing rod are propped against the metallic strengthening plate.

3. The sucker device for a fixing support as claimed in claim 1, the body having a spherical joining part on an upper end of the sleeve part thereof to be joined on a bottom portion of a fixing support;
the fixing support having has a truncated-cone shaped joining post projecting from the bottom portion; the truncated-cone shaped joining post having a spherical joining cavity thereon;
the spherical joining part of the body being detained in the spherical joining cavity of the truncated-cone shaped joining post;
the joining post having a plurality of apertures, and an outer threaded portion; the joining post of the fixing support having a constricting component positioned around it; the constricting component having a middle screw hole; the constricting component being threadedly engaged with the outer threaded portion of the joining post at the middle screw hole thereof.

4. The sucker device for a fixing support as claimed in claim 3, further comprising a coupling component to couple the fixing support to the body thereof;
the coupling component having a rod part, and a truncated-cone shaped joining post protruding from a lower end of the rod part thereof; the truncated-cone shaped joining post having a spherical joining cavity thereon; the spherical joining part of the body being detained in the spherical joining cavity of the joining post of the coupling component; the joining post having a plurality of apertures, and an outer threaded portion;
the joining post of the coupling component having a constricting component positioned around it; the constricting component having a middle screw hole; the constricting component being threadedly engaged with the outer threaded portion of the joining post of the coupling component at the middle screw hole thereof;
the coupling component having a spherical joining part on an upper end of the rod part thereof; the joining component being joined to the fixing support with the spherical joining part thereof being detained in the spherical joining cavity of the joining post protruding from the bottom of the fixing support.

* * * * *